Figure 1:
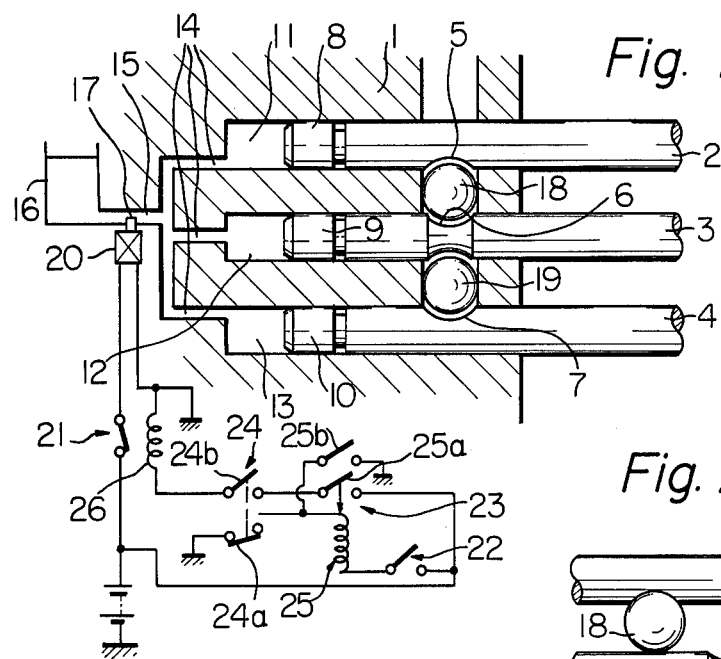

United States Patent [19]
Kurisu

[11] 4,083,420
[45] Apr. 11, 1978

[54] INTERLOCKING SYSTEM OF MANUAL CHANGE SPEED GEAR

[76] Inventor: Katsuyasu Kurisu, No. 1293-1, Suenaga, Takatsu-ku, Kawasaki City, Japan

[21] Appl. No.: 511,632

[22] Filed: Oct. 3, 1974

[30] Foreign Application Priority Data

Nov. 5, 1973 Japan .................. 48-127135

[51] Int. Cl.² .................. B60R 21/10; F16H 57/06
[52] U.S. Cl. .................. 180/82 C; 74/477
[58] Field of Search .................. 74/475, 477, 335, 346, 74/364; 91/413, 411, 459, 424; 180/82 C

[56] References Cited

U.S. PATENT DOCUMENTS

| | | | |
|---|---|---|---|
| 1,865,690 | 7/1932 | Hanson | 74/477 X |
| 2,320,454 | 6/1943 | Eberhard | 74/477 |
| 2,328,227 | 8/1943 | Orr | 74/477 |
| 2,637,221 | 5/1953 | Backus et al. | 74/477 |
| 2,835,136 | 5/1958 | Berthiez | 74/346 X |
| 2,924,124 | 2/1960 | Froslie | 74/475 X |
| 3,250,142 | 5/1966 | Schuster et al. | 74/475 X |
| 3,545,295 | 10/1968 | Ravello | 74/477 X |
| 3,939,940 | 2/1976 | Sasabe et al. | 180/82 C |
| 3,944,013 | 3/1976 | La Pointe | 91/413 X |
| 3,945,458 | 3/1976 | Suzuki et al. | 74/477 X |
| 3,948,339 | 4/1976 | Iwanaga | 180/82 C |
| 3,958,658 | 5/1976 | Miyauchi | 180/82 C |

*Primary Examiner*—Allan D. Herrmann

[57] ABSTRACT

Parallelly spaced apart shift rods are interlocked by balls between adjacent shift rods. Plungers are mounted on respective shift rods and received in bores communicating with a source of fluid under pressure through a valve which, when closed, blocks movements of the rods. The valve is opened when the driver sits on his seat and wears his safety seat belt, to unlock movements of the plungers in their bores as well as movements of the rods.

4 Claims, 4 Drawing Figures

U.S. Patent April 11, 1978 4,083,420

INTERLOCKING SYSTEM OF MANUAL CHANGE SPEED GEAR

This invention relates to an interlocking apparatus for a manually operated change speed gear of a motor car.

In recent years, seat belts are used extensively in motor cars for protecting the occupants thereof in collisions. However, some occupants do not wear the seat belts for the reason of nuisance of the fastening them thus suffering injury in case of accidents.

Since the effectiveness of the seat belts has been proven by various experiments and in actual collisions, certain proposals have been made to force the driver to wear his seats belt. Accordingly, it is desirable to enable the driver to operate the car only when he wears his seat belt.

Accordingly, it is an object of this invention to provide an improved interlocking apparatus for a manually operated change speed gear of a motor car that enables the driver to operate the motor car only when he sits on his seat and wears his safety seat belt.

Another object of this invention is to provide an improved interlocking apparatus of the character described above which is operated electrically.

According to this invention, there is provided an interlocking apparatus for a manually operated change speed gear of a motor car of the type comprising a plurality of spaced apart parallel shift rods for changing gears and interlocking members disposed between adjacent shift rods characterized in that there are provided plungers mounted on respective shift rods to be operative in respective chambers, a liquid reservoirs, a plurality of passages for interconnecting the chambers with the liquid reservoir thereby filling the chambers with liquid, a valve for connecting and disconnecting the chambers to and from the liquid reservoir and actuating means for closing the valve only when the driver of the motor car performs a prescribed safety operation.

Advantageously, the actuating means is operated by a coil which is connected in series with a seat switch which is closed when the driver sits on his seat and a seat belt switch which is closed when the driver fastens his safety seat belt.

Figure 2:
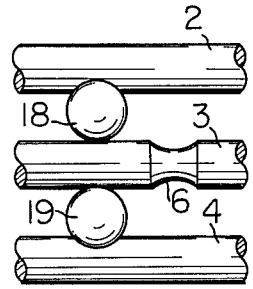
Figure 3:
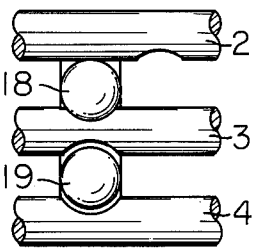
Figure 4:
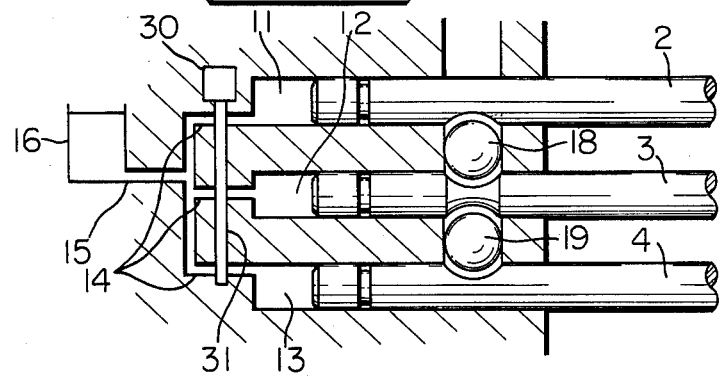

The construction and operation of the interlocking apparatus can be more fully understood from the following detailed description taken in conjunction with the accompanying drawing in which:

FIG. 1 is a section view, also showing an electrical circuit of a first preferred embodiment of a novel interlocking apparatus of this invention;

FIGS. 2 and 3 explain the operation of the shift rods of a manually operated change speed gear; and FIG. 4 is a section view of a second preferred embodiment of this invention.

A first preferred embodiment of this invention shown in FIG. 1 comprises a transmission casing 1 and a plurality of, for example three, shift rods 2, 3 and 4 slidably received in the casing 1 for changing gears in a manner well known in the art. Respective shift rods are provided with semiannular recesses 5, 6 and 7, respectively, and piston heads or plungers 8, 9 and 10 at their inner ends. Bores 11, 12 and 13 accommodating these piston heads are connected to a common passage 15 via passages 14 and the common passage 15 communicates with a source of hydraulic fluid under pressure 16 through an open-closed valve 17.

The recesses 5, 6 and 7 of the shift rods 2, 3 and 4 may have a semicircular profile and are constructed to receive interlocking members in the form of balls 18 and 19 which are used in a manner to be described later.

The valve 17 is operated by a solenoid, with a coil 20 for example, which is normally energized through a normally closed switch 21 whereby the valve 17 is normally closed.

There are provided a seat switch 22 arranged to close when the driver is seated on his seat of the motor car and a seat belt relay switch 24 including two interlocked switches 24a and 24b, the former being opened when the driver fastens his seat belt whereas the latter closes at the same time. A relay 25 is connected in series with seat switch 22 and switch 24a. The relay has a switch 25a connected in series with switch 24b and a self-holding switch 25b. Accordingly, when the driver sits down on his seat, relay 25 is energized to close its switches 25a and 25b. The relay is maintained in the energized condition as long as the driver sits on his seat. When the driver wears a safety seat belt, the seat belt switch 24 is operated to open switch 24a and close switch 24b. Opening of switch 24a does not de-energize relay 25 because it is self-holding. Closure of switch 24b energizes coil 26 to open switch 21 for de-energizing coil 20 whereby the valve 17 is operated. It will thus be noted that the actuator will not be disabled unless the driver sits on his seat and wears his safety seat belt. In other words, if the driver tries to change gear without wearing the seat belt, gear changing would not be possible because the passage 15 is closed by valve 17. More particularly, if the driver tries to operate shift rod 3, the pressure created in chamber 12 is transmitted to other chambers 11 and 13 though incompressible liquid tending to move other shift rods 2 and 4. However, these rods can not move due to the interlocking action of balls 18 and 19. Due to this interlocking action, neither the shift rod 3 can be moved. In the same manner, if the driver tries to move shift rod 2 the shift rods 3 and 4 are prevented from moving due to the interlocking action of the balls. In this manner, according to this invention it is possible to prevent operation of any one of the shift rods unless the driver sits on his seat and wears the safety seat belt. However, when the driver seats on his seat, seat relay 25 is energized to close its switches 25a and 25b. Then, when the driver wears his seat belt, switch 24b of the seat belt relay switch is closed whereby coil 26 is energized to open switch 21. As a result valve 17 opened to communicate liquid passages 14 with source 16. Accordingly, any of the shift rods can be moved because no back pressure is established to its piston head. When one of the shift rods, for example shift rod 3 is moved to the left for effecting a desired gear change, the rod 3 forces interlocking balls 18 and 19 to enter into semiannular recesses 5 and 7 of the other shift rods 2 and 4, as shown in FIG. 2 thus preventing their operation.

In a second preferred embodiment shown in FIG. 4, a single valve 31 operated by an actuator 30 is provided for opening and closing the respective passages 14. Also in this embodiment, so long as the valve 31 is closed it is impossible to operate any of the shift rods.

As has been described hereinabove the invention provides a new and improved interlocking apparatus for a manually operated change speed gear of a motor car which can effectively prevent operation of the motor car unless the driver sits on his seat and wears his safety seat belt.

It will be clear that any other safety device than the seat belt can also be used for operating the interlocking apparatus of this invention.

What is claimed is:

1. A interlocking system of a manual change speed gear of a motor car having a plurality of spaced apart parallel shift rods for changing gears and interlocking members disposed between adjacent shift rods, the system comprising plungers mounted on respective shift rods operative in respective bores, a source of hydraulic fluid under pressure, a plurality of passageways for interconnecting said bores with said source, a valve controlling fluid communication between said bores and the source, said valve being closed only when the driver of the motor car fails to perform a prescribed safety operation, and said valve in its closed position confining the fluid within the bores and passageway so that upon attempted movement of anyone of said shift rods this rod and the other shift rods cannot be moved due to pressure forces transmitted through the incompressible liquid and acting upon said rods in conjunction with the inner locking members disposed upon adjacent shift rods.

2. In an interlocking system between a safety device and a manually operated transmission of a motor vehicle having a plurality of spaced apart shift rods and means for preventing two of said shift rods from moving simultaneously, utmost ends of the shift rods being respectively slidably inserted into bores formed in the transmission casing, the improvement comprising:
   a plurality of pistons respectively mounted on said utmost ends of the shift rods, said pistons sealingly and slidably respectively accommodated in said bores so as to form expansible chambers;
   a source of hydraulic fluid under pressure;
   a passageway connecting said expansible chambers and said source;
   a valve positioned within said passageway for closing said passageway when it is de-energized and for opening said passageway when it is energized; and
   an actuator connected to said valve for energizing said valve when said safety device is correctly set, whereby when one said valve is energized respective shift rods can be slidably moved within their associated bores and when said valve is de-energized no one of said shift rods can be moved.

3. The interlocking system as in claim 2 wherein said bores communicate with the source through individual passageways and a common passageway and said valve is provided in said common passageway.

4. In an interlocking system between a safety device and a manually operated transmission of a motor vehicle having a seat belt, a plurality of spaced apart shift rods and means for preventing two of said shift rods from moving simultaneously, utmost ends of the shift rods being respectively slidably inserted into bores formed in the transmission casing, the improvement comprising:
   a plurality of pistons respectively mounted on said utmost ends of the shift rods, said pistons sealingly and slidably respectively accommodated in said bores so as to form expansible chambers, each expansible chamber being formed between a bottom wall of the bore and a head of the piston;
   a source of hydraulic fluid communicated with the atmosphere;
   a passageway connecting said expansible chambers and said source;
   a valve positioned within said passageway closing said passageway when it is de-energized and opening said passageway when it is energized;
   an actuator connected to said valve, energized by a specific signal from an electric circuit including a seat switch and seat belt switch, said valve in its open position permitting movement of said shift rods within said bores and in its closed position confining the fluid within the bores and passageway so that open attempted movement of any one of said shift rods, this rod, and the other rods can not be moved due to pressure forces transmitted through the incompresiible liquid and acting upon said rods in conjunction with the interlocking members disposed between adjacent shift rods.

* * * * *